US006895016B1

United States Patent
Nguyen et al.

(10) Patent No.: US 6,895,016 B1
(45) Date of Patent: May 17, 2005

(54) METHOD AND APPARATUS FOR INTERFACING MULTIPLE DATA CHANNELS TO A BUS

(75) Inventors: Han Quang Nguyen, Allentown, PA (US); Avinash Velingker, Orefield, PA (US); Richard Joseph Niescier, Bethlehem, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/427,961

(22) Filed: Oct. 27, 1999

(51) Int. Cl.[7] .................................................. H04J 3/16
(52) U.S. Cl. ...................................................... 370/437
(58) Field of Search ................................ 370/357–366, 370/375, 498, 436–439

(56) References Cited

U.S. PATENT DOCUMENTS 4,958,342 A * 9/1990 Williams et al.
6,327,259 B1 * 12/2001 Chiu et al.
6,625,134 B1 * 9/2003 Ji et al. ....................... 370/331

* cited by examiner

Primary Examiner—Chi Pham
Assistant Examiner—Thai Hoang
(74) Attorney, Agent, or Firm—Synnestvedt Lechner & Woodbridge, LLP

(57) ABSTRACT

A time division multiplexing (TDM) method and apparatus for interfacing data channels with a TDM bus. The TDM interface uses a processor and a channel coordinator circuit to indicate which data channels are active, and to assign which TDM transmit channels and which TDM receive channels will correspond to the active data channels. The processor controls the flow of data by using a channel coordinator circuit which controls multiple shift registers. The multiple shift registers control the flow of data between the active channels and the TDM bus. Multiple storage registers are used to buffer the data flowing between the active channels and the shift registers.

23 Claims, 3 Drawing Sheets

METHOD AND APPARATUS FOR INTERFACING MULTIPLE DATA CHANNELS TO A BUS

FIELD OF THE INVENTION

The present invention relates to interfacing multiple communication channels from one or more modems to a bus.

BACKGROUND OF THE INVENTION

Computers have traditionally interfaced with telephone company central offices over the plain old telephone service (POTS) network. A digital signal processor (DSP) within a computer sends information to the telephone company central office using a modem to transform the digital signals from the DSP into analog signals that can be transmitted over the POTS network. The modem also transforms analog signals received from the telephone company central office into digital signals for use by the DSP. The analog-to-digital and digital-to-analog conversions performed by the modems are accomplished with coder/decoders (CODEC). A CODEC is capable of interfacing with one DSP at a time. Therefore, interfacing multiple DSPs with a telephone company central office requires multiple modems or multiple CODECs within a modem.

FIG. 5 illustrates a typical interface between multiple data channels 2 and a TDM bus 8. This arrangement uses a separate modem 6 and control 4 for each data channel 2 which is to interface with the TDM bus 8.

Time division multiplexing (TDM) techniques are becoming increasingly common in telecommunication systems to increase the amount of information that can be carried on a transmission line. For example, TDM techniques are used in the internal architecture of private branch exchanges (PBXs) and in the transmission of digital signals over telecommunication lines to maximize the amount of data which can be handled by these systems.

The majority of contemporary telecommunication systems use a TDM arrangement in which each off-hook connection (i.e., when the telephone line is in use) is allocated a specific periodic time interval for information transfer. The periodic time interval is generally equal to eight times the data bit rate of the connected device, allowing a word (8 bits) of information to flow during each periodic time interval assigned to that device.

Conventional time division multiplexing (TDM) systems are designed to operate according to standard carrier TDM arrangements which have the capability of handling multiple channels on the same transmission line, such as T1 (24 channels), E1 (32 channels), 64-Slot (64 channels), and 128-Slot (128 channels). Each TDM arrangement consists of a fixed length frame used to transmit data. The frame is divided into a predetermined number of time slots, each representing a different channel. For example, a T1 line is designed to carry 24 voice-grade channels with data from each channel broken down into 8 bit words. Combining 24 voice channels (24 channels times 8 bits per channel equals 192 bits) into a serial bit stream and including a framing bit yields a frame size of 193 bits. E1, 64-Slot, and 128-Slot TDM arrangements operate according to similar principles, with the exception that a framing bit is not used.

As the requirements for bandwidth have increased, many companies now connect to the telephone company central offices digitally, rather than over the traditional POTS network. Companies are being connected to telephone company central offices with digital transmission lines such as T1 lines that utilize time division multiplexing (TDM) techniques which were previously used exclusively by telephone companies in the backbone between telephone company central offices.

Internet service providers (ISPs) offer Internet access to home users and small businesses. ISPs permit access to the Internet by allowing home users to call local telephone numbers and use modems connected to the user's computer to communicate with modems located at the ISP. The ISP then processes the information received at its modems to generate data streams which can be placed onto digital telecommunication lines, such as a T1 line, and transfers the data received by the modems located at the ISP to a telephone company central office for connection to the Internet. As the popularity of the Internet expands, ISPs will require telecommunication devices which allow data received from users through a large number of modem connections to be processed and placed on transmission lines that make the most efficient use of the transmission lines in a minimal amount of hardware space.

SUMMARY OF THE INVENTION

The present invention discloses a method and apparatus for interfacing multiple data channels to a bus. The interface is designed to digitally interface multiple data channels with a time division multiplexing (TDM) bus. In a preferred embodiment, the TDM bus operates according to standard TDM arrangements such as T1 (24 channels), E1 (32 channels), 64-Slot (64 channels), and 128-Slot (128 channels).

The invention digitally interfaces multiple communication channels to a bus by controlling a series of shift registers and storage registers to transfer information from multiple data channels to the bus and to transfer information from the bus to multiple data channels. The storage registers act as buffers between the shift registers and the data channels to provide additional system flexibility and prevent data from being lost. A processor and digital circuitry are used to manipulate the shift registers and storage registers. In a preferred embodiment, information corresponding to a given data channel can be transmitted on one TDM channel and received on another TDM channel. In addition, the transfer of data for a given data channel may have an asynchronous relationship between the data being sent out over the TDM bus and the data being received from the TDM bus.

The processor controls the relationships between the data channels and the channels within the TDM transmit and receive frames. The processor performs this task by assigning a channel within a TDM transmit frame and a channel within a TDM receive frame to an active data channel. A channel counter is used to track which channel of the current transmit frame and which channel of the current receive frame are present at the TDM bus interface. The processor operates in conjunction with the channel counter to determine the appropriate time for shifting data out of the appropriate shift register on the transmit side and latching data into the appropriate shift register on the receive side. In a preferred embodiment, processing efficiency is achieved by monitoring which channels are active so that data will only be latched or shifted if the processor indicates that the corresponding channel is active.

DETAILED DESCRIPTION OF THE INVENTION

Figure 1:
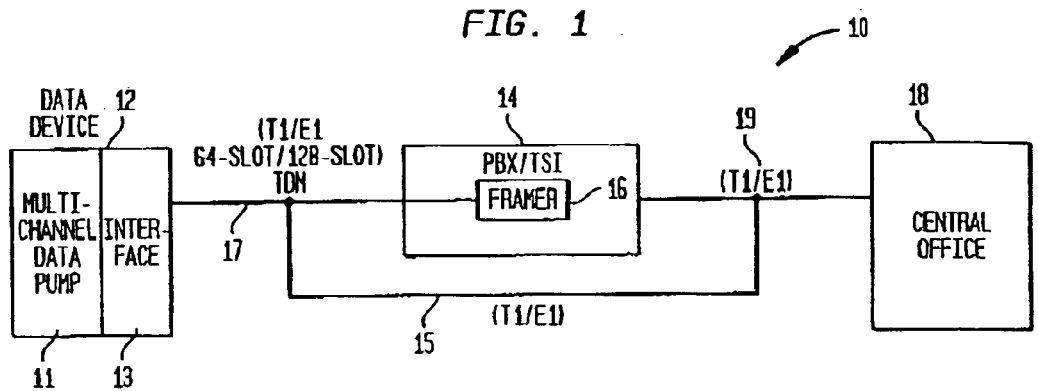
FIG. 1 is a block diagram of a interface between a data device and a telephone company central office in accordance with the present invention.

FIG. 1 is illustrative of a communication arrangement between a multi-channel data device and a telephone company central office. The arrangement 10 comprises a multi-channel data device 12, a private branch exchange/time slot interchange (PBX/TSI) 14 containing a framer 16, and a telephone company central office 18. Multi-channel data device 12 comprises a multi-channel data pump 11 and additional interface circuitry 13 for interfacing the multi-channel data pump 11 with a time division multiplexed (TDM) transmission line 17. The multi-channel data device 12 is coupled to the PBX/TSI 14 via the TDM transmission line 17. The PBX/TSI 14 contains a framer 16 for organizing transmit and receive channel time slots according to standard TDM arrangements, such as T1 (24 channels), E1 (32 channels), 64-Slot (64 channels), or 128-Slot (128 channels). The PBX/TSI 14 is coupled to a central office 18 through transmission line 19 for connection to other central offices or the Internet using communication standards that are well known in the art. The PBX/TSI 14 may also be connected to other PBX/TSI locations. Alternatively, interface circuitry 13 may be connected directly to central office 18 through transmission line 15. Central office 18 contains a framer to which interface 13 may be connected. Currently, the framers within central offices 18 are capable of handling only T1 and E1 TDM arrangements. However, PBX/TSI 14 or data device 12 will be able to interface with central office 18 using other TDM arrangements once they are implemented by central office 18.

The present invention is directed at the interface circuitry 13 which interfaces the multi-channel data pump 11 with TDM transmission line 17. Multi-channel data pump 11 may be a modem or other data transmission device. In a preferred embodiment, the multi-channel data pump 11 and interface 13 will transmit and receive data from the TDM transmission line 17. However, transmit only and receive only arrangements would be within the scope of the present invention. In order to facilitate discussion, the connection of interface circuitry 13 to PBX/TSI 14 will be described in detail. However, the connection of interface circuitry 13 directly to central office 18 would operate according to similar principles.

Figure 2:
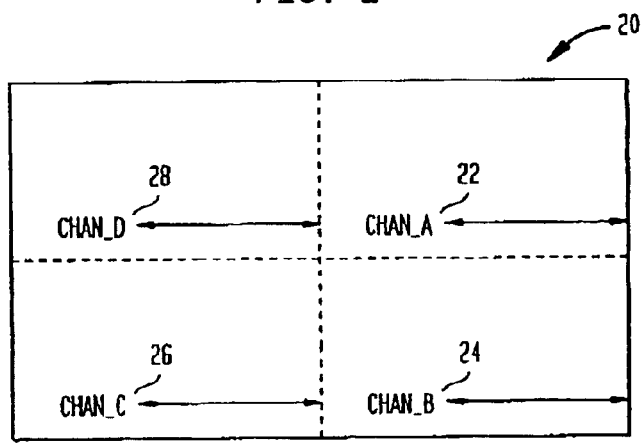
FIG. 2 is a block diagram of a 4-channel data pump.

FIG. 2 depicts a standard 4-channel data pump 20. The 4-channel data pump 20 consists of four separate data channels; chan-A 22, chan-B 24, chan-C 26, and chan-D 28. A 4-channel data pump 20 will be used to describe the present invention, however, the inventive concept would apply equally well to multiple single, multiple multi-channel data pumps or to data pumps having the capacity for many more channels.

Figure 3:
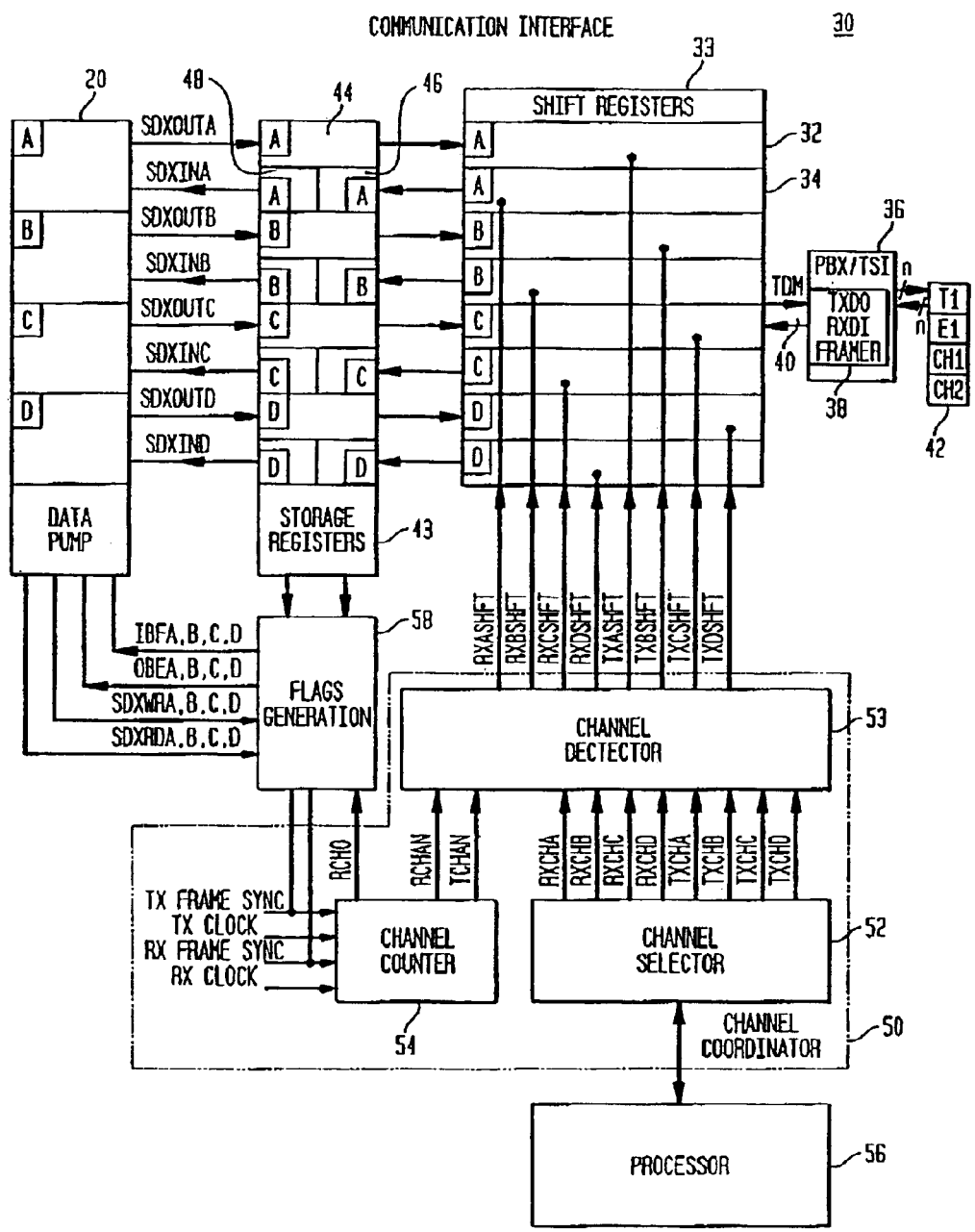
FIG. 3 is a block diagram of a communication interface in accordance with the present invention.

FIG. 3 illustrates a communication arrangement 30 for interfacing a 4-channel data pump 20A–D to a private branch exchange/time slot interchange (PBX/TSI) 36 in accordance with the present invention. In a preferred embodiment, communication arrangement 30 comprises one or more 4-channel data pumps 20A–D, transmit storage registers 44A–D, receive storage registers 46A–D and 48A–D, transmit shift registers 32A–D, receive shift registers 34A–D, framer 38, flag generation circuit 58, channel coordinator circuitry 50, and a processor 56. The 4-channel data pump 20A–D represent 4 different channels of data, wherein each channel is capable of transmitting and receiving data.

In a preferred embodiment, the processor 56 is a conventional reduced instruction set computer (RISC) which provides very high speed processing. Processor 56 controls the selection of the transmit and receive channels of a TDM arrangement which will interface with the individual channels of the 4-channel data pump 20A–D. Although a RISC Processor 56 is used to describe the preferred embodiment of the invention, it will be readily apparent to those skilled in the art that many types of processors could be used to practice the inventions, such as a microprocessor, data processor, digital signal processor (i.e., DSP), microcontroller, computer, state machine, or essentially any digital processing circuit.

The present invention provides increased flexibility in the transfer of information between data pumps 20A–D and TDM bus 40. By using processor 56, shift registers 33, storage registers 43, flag generation circuitry 58, and channel coordinator circuitry 50, the communication interface 30, in accordance with the preferred embodiment of the present invention, offers increased flexibility in system design and maximizes the use of system resources. The communication interface 30 allows designers to design systems in which the data of an individual channel of a data pump 20A–D is transmitted to and received from the TDM bus 40 on the same channel of the designated TDM arrangement 42 at a synchronous transfer rate. For example, chan-A data pump 20A could transmit and receive data on channel 4 of a TDM transmit frame and a TDM receive frame, respectively, on TDM bus 40. Alternatively, any combination of channels operating synchronously or asynchronously could be used. For example, chan-B data pump 20B could transmit data on channel 4 during every transmit frame and receive data on channel 2 during every other receive frame. The system can even accommodate an arrangement where the bit transfer rates of the incoming channels are different from the bit transfer rates of the outgoing channels.

To facilitate the description of the present invention, chan-A data pump 20A will be used to describe the flow of data between the data pumps 20A–D and the framer 38 within PBX/TSI 36. In addition, the invention will be first described in general with specific information regarding channel detection, the operation of the storage registers 43 and the operation of the shift registers 33 following in subsequent paragraphs.

In the transmit portion of the system, data pump 20A produces outgoing data SDXOUTA. Outgoing data SDXOUTA is loaded into transmit storage register 44A. Outgoing data SDXOUTA is then latched into transmit shift register 32A from transmit storage register 44A. In a preferred embodiment, transmit shift registers 32A–D are 8-bit parallel-in/serial-out shift registers. Outgoing data SDXOUTA is then serially shifted out onto TDM transmission line 40 as a channel of signal TXDO in a selected channel time slot corresponding to a standard TDM arrangement 42.

The arrangement of processor 56, shift register 32A, storage register 44A, and channel coordinator circuitry 50 allows outgoing data SDXOUTA to be placed on any channel with the standard TDM arrangements 42 which are regulated by framer 38 within PBX/TSI 36. The details of channel selection and the timing for the operation of the transmission shift registers 32A–D and the transmission storage registers 44A–D will be described in detail in paragraphs following a brief discussion of the receive portion of the system.

In the receive portion of the system, a channel of receive signal RXDI corresponding to a channel time slot of a standard TDM arrangement 42 regulated by framer 38 within PBX/TSI 36 is shifted into receive shift register 34A. In a preferred embodiment, receive shift registers 34A–D are 8-bit serial-in/parallel-out shift registers. The portion of receive signal RXDI shifted into receive shift register 34A is designated as incoming data SDXINA. The incoming data SDXINA is then loaded into receive storage register 46A. Receive storage register 46A is the first stage in a two stage receive buffering system. A two stage buffering system is used to prevent data from being overwritten and to allow flexibility in signaling. The incoming data SDXINA is then transferred to the second receive buffering stage, receive storage register 48A. Finally, incoming data SDXINA is transferred to data pump 20A.

The interaction of framer 38, flag generation circuit 58, channel coordinator circuitry 50, and processor 56, and their interaction with the data pump channels 20A–D, storage registers 44A–D, 46A–D and 48A–D, and shift registers 32A–D and 34A–D will now be described in detail.

In a preferred embodiment, channel coordinator circuitry 50 is comprised of a channel counter 54, channel selector 52, and channel detector 53. The channel coordinator circuitry 50 uses information from processor 56 and framer 38 to control the operation of transmit shift registers 32A–D and receive shift registers 34A–D.

Channel counter 54 is a conventional counter. In a preferred embodiment, channel counter 54 has separate frame syncs and clocks for performing transmit functions and receive functions, allowing transmit and receive operations to operate asynchronously of one another. For the transmit portion of channel counter 54, the transmit counter portion is reset to zero when a transmit frame sync pulse (TX FRAME SYNC) is received. Thereafter, the counter starts incrementing by one for every 8 cycles of the transmit clock (TX CLOCK). The transmit portion of the channel counter 54 will receive a TX FRAME SYNC pulse at the beginning of each frame of the TDM arrangement. The transmit portion of the channel counter 54 will then count upwards from zero at the time slot rate until the next TX FRAME SYNC pulse is received. The value indicated by the transmit portion of counter 54 therefore corresponds to the present channel time slot available to receive data on TDM bus 40 which corresponds to TDM arrangement 42. The framer 38 located within PBX/TSI 36 is responsible for providing channel counter 54 with the TX FRAME SYNC pulses and the TX CLOCK speed.

For the receive portion of channel counter 54, the receive counter portion is reset to zero when a receive frame sync pulse (RX FRAME SYNC) is received. Thereafter, the counter starts incrementing by one for every 8 cycles of the receive clock (RX CLOCK). The receive portion of the channel counter 54 will receive a RX FRAME SYNC pulse at the beginning of each frame of the TDM arrangement. The receive portion of the channel counter 54 will then count upwards from zero at the time slot rate until the next RX FRAME SYNC pulse is received. The value indicated by the receive portion of counter 54 therefore corresponds to the present channel available for reception from TDM bus 40 which corresponds to TDM arrangement 42. The framer 38 located within PBX/TSI 36 is responsible for providing channel counter 54 with the RX FRAME SYNC pulses and the RX CLOCK speed.

Processor 56 interacts with channel selector 52 to indicate which data pumps 20A–D are active and which transmit channel and which receive channel are to be assigned to the active data pumps 20A–D. For example, the processor 56 may determine that data pump chan-A 20A and data pump chan-C are active, and that TDM transmit channel 10 should be mapped to data pump 20A, TDM transmit channel 5 should be mapped to data pump 20C, TDM receive channel 8 should be mapped to data pump 20A, and TDM receive channel 10 should be mapped to data pump 20C. The use of processor 56 allows any data pump 20A–D to be assigned to any TDM channel. In addition, system resources are maximized by only activating individual shift registers 32A–D and 34A–D if a corresponding data pump 20A–D is active.

Channel detector 53 interacts with channel counter 54 and channel selector 52 to determine when to shift data out of transmit shift registers 32A–D and receive shift registers 34A–D. Channel detector 53 matches the transmit and receive channels assigned to active data pumps 20A–D with the corresponding current time slots of the TDM bus 40 transmit and receive channels as indicated by channel counter 54. When a match is made in the transmit portion, channel detector 53 prompts the appropriate transmit shift register 32A–D to shift out data contained within the shift register 32A–D onto the TDM bus 40. When a match is made in the receive portion, channel detector 53 prompts the appropriate receive shift register 34A–D to latch in data from the TDM bus 40. For example, if data pump 20A is assigned to transmit channel 5 and data pump 20A has data to transmit, processor 56 would inform channel selector 52 that data pump 20A is active, has data to transmit, and is assigned to transmit channel 5. If a TX FRAME SYNC pulse has recently been received, the transmit portion of channel counter 54 will be counting up from zero at a rate which corresponds to the individual channels of transmit TDM arrangement 42 on TDM bus 40. When the transmit portion of channel counter 54 reaches 5, a match will occur between channel counter 54 and channel selector 52, prompting channel detector 53 to have the data pump 20A transmit data, previously latched into transmit shift register 32A, shift the transmit data onto the TDM bus 40. The reception of data from TDM bus 40 occurs in a similar manner.

The flag generation circuit 58 interfaces with data pumps 20A–D, transmit storage registers 44A–D, receive storage registers 46A–D and 48A–D, and channel counter 54 to control the flow of data through the communication interface 30. In the preferred embodiment, each channel of data which interfaces with 4-channel data pump 20A–D uses four channel specific data information signals to regulate the flow of data. For example, chan-A 20A uses the following data information signals: channel-A input buffer full (IBFA), chan-A output buffer empty (OBEA), chan-A data pump wrote data into transmit storage register (SDXWRA), and chan-A data pump has read storage register (SDXRDA). Accordingly, chan-B 20B signals are IBFB, OBEB, SDXWRB, and SDXRDB. Chan-C 20C signals are IBFC, OBEC, SDXWRC, and SDXRDC. Chan-D 20D signals are IBFD, OBED, SDXWRD, and SDXRDD. In addition, a receive channel 0 (RCH0) signal is used which indicates that a new TDM bus 40 frame is ready to be received. The RCH0 signal is common to all data pumps 20A–D.

Figure 4:
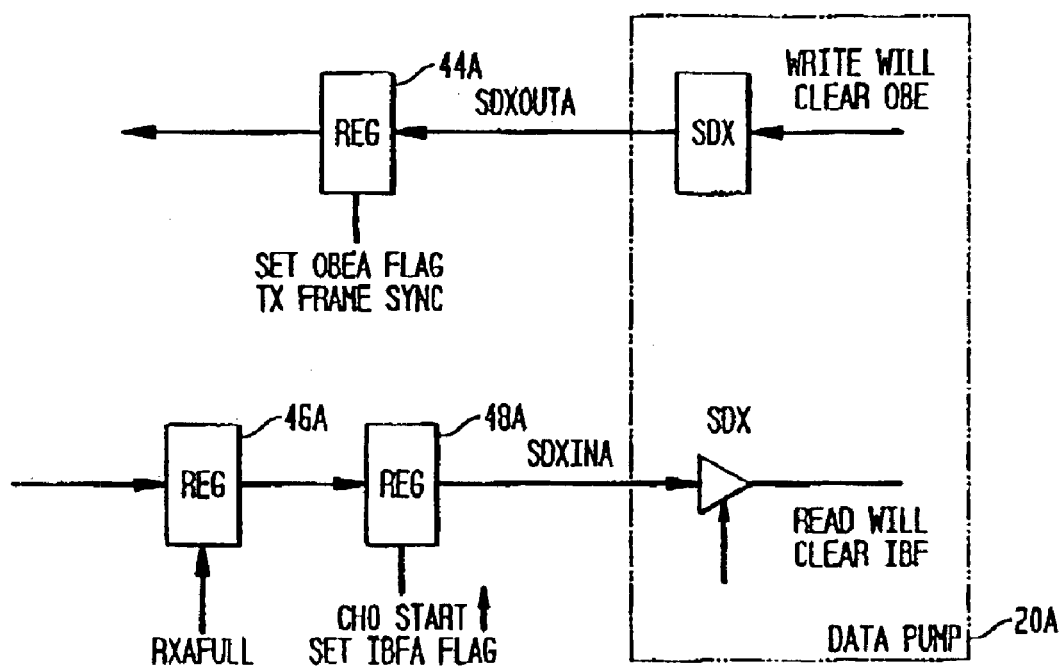
FIG. 4 is a block diagram of transmit and receive data signal buffering in accordance with the present invention.
Figure 5:
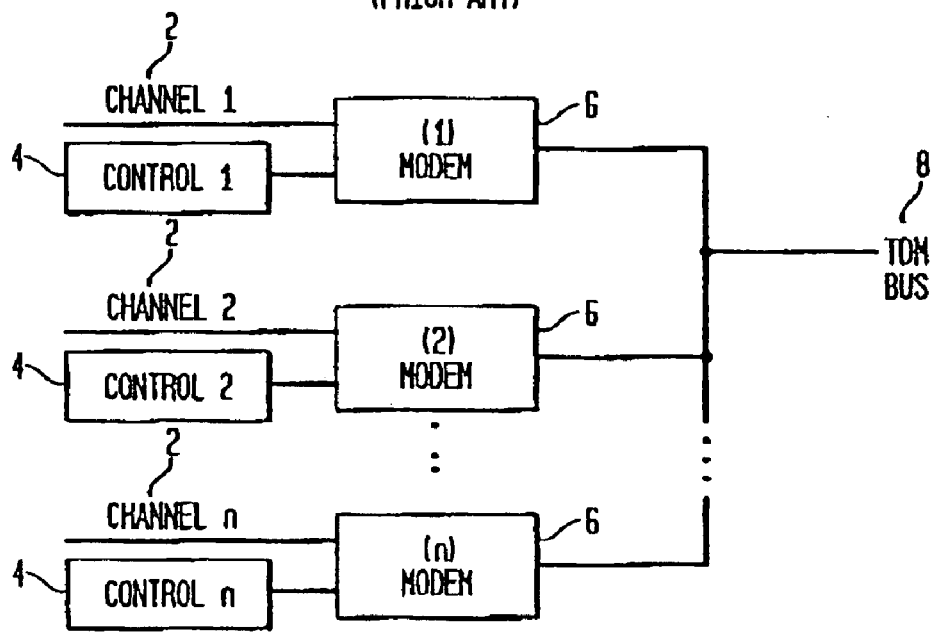
FIG. 5 is a block diagram of a prior art TDM bus interface.

FIG. 4 illustrates the operation of the four data information signals and the common RCH0 signals on the transmit storage registers 44, receive storage registers 46 and 48, and the data pump 20. For illustrative purposes only, chan-A information signals will be described. The other data pump channels 20B–D operate according to the same principles.

Data pump channel 20A will write data to transmit storage register 44A when chan-A output buffer empty (OBEA) flag is set. The OBEA flag is set when the TX FRAME SYNC is received from framer 38 by flag generation circuitry 58. The TX FRAME SYNC indicates that the shift registers are transmitting information onto the TDM bus 40 so that there is no concern with overwriting data in the transmit storage register 44A. Writing to the transmit storage register 44A will clear the OBEA flag.

Data pump 20A will read data from the second stage receive storage register 48A when the chan-A input buffer full (IBFA) flag is set. The IBFA-D flags are set when the receive channel 0 (RCH0) of TDM bus 40 in accordance with TDM bus arrangement 42 is determined to be present by channel counter 54. The RCH0 signal indicates that receive data (RXDATA) from the previous frame is being latched into the second stage receive storage register 48A–D. The RXDATA is double buffered and delayed by one frame. Specifically, the RXDATA received from the previous frame is latched into storage register 48A–D upon the reception of the current RXDATA. Reading the second stage receive storage register 48A–D will clear the corresponding IBFA-D flag, freeing up the corresponding second stage receive storage register 48A–D for another channel of data.

The second stage receive storage register 48A–D is filled from a first stage receive storage register 46A–D which corresponds to the output of receive shift registers 34A–D. A two stage buffering scheme is used to prevent incoming data from overwriting data in a storage register prior to being read by the data pump 20A–D. A chan-A receive register full (RXAFULL) flag is set once 8 bits (one word) of data has been shifted into receive shift register 34A. The first stage receive storage registers 46A will latch in the data from shift register 34A when the RXAFULL flag is set. The second stage receive storage register 48A will latch data in when the RCH0 flag is set.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to way of example only, and not limiting. The invention is limited only as defined in the following claims and equivalents thereto.

What is claimed is:

1. A time division multiplexing (TDM) arrangement for interfacing with a TDM bus having a plurality of transmit channels and a plurality of receive channels comprising:
   a data pump for generating a transmit data signal and receiving a receive data signal;
   a transmit storage register coupled to said data pump for buffering said transmit data signal;
   a transmit shift register coupled between said transmit storage register and said TDM bus for latching said transmit data signal from said transmit storage register and shifting said transmit data signal onto one of said plurality of transmit channels of said TDM bus;
   a receive shift register coupled to said TDM bus for receiving one of said plurality of receive channels from said TDM bus; and
   a receive buffer coupled between said receive shift register and said data pump for buffering said one of said plurality of receive channels;
   such that said data pump generates said transmit data signal, said transmit data signal passes through said transmit storage register and then through said transmit shift register onto said TDM bus; and said receive shift register receives said one of said plurality of said receive channels as said receive data signal, said receive data signal passes through said receive shift register and then through said receive buffer to said data pump; and,
   a channel coordinator coupled to said transmit shift register and said receive shift register for controlling said transmit shift register and said receive shift register, such that said channel coordinator controls which one of said plurality of transmit channels corresponds to said transmit data signal and controls which one of said plurality of receive channels corresponds to said receive data signal, and said channel coordinator controls said transmit shift register to shift said transmit data signal onto said TDM bus when said one of said plurality of transmit channels is available and controls said receive shift register to latch a portion of said receive data signal into said receive shift register when said one of said plurality of receive channels is available.

2. The TDM arrangement of claim 1, wherein said receive buffer is a two stage receive buffering system comprising a first receive storage register coupled to said receive shift register and a second receive storage register coupled to said data pump.

3. The TDM arrangement of claim 2, wherein said transmit shift register is a parallel-in/serial-out shift register and said receive shift register is a serial-in/parallel-out shift register.

4. The TDM arrangement of claim 2, further comprising a framer coupled to said channel coordinator for defining a transmit frame comprising said plurality of transmit channels and producing a transmit frame sync signal between each transmit frame, and defining a receive frame comprising said plurality of receive channels and producing a receive frame sync signal between each receive frame coordinator.

5. The TDM arrangement of claim 4, wherein said channel coordinator comprises:
   a channel counter circuit coupled to said framer producing a transmit channel indicator for indicating which transmit channel of said plurality of transmit channels is present at the interface to the TDM bus, producing a receive channel indicator for indicating which receive channel of said plurality of receive channels is present at the interface to the TDM bus, and producing an initial receive channel indicator;
   a channel selector circuit producing a transmit data channel matching signal which matches said transmit data signal to a transmit data channel, and producing a receive data channel matching signal which matches said receive data signal to a receive data channel; and
   a channel detector circuit coupled to said channel counter circuit and said channel selector circuit, said channel detector circuit shifting said transmit shift register when there is a match between said transmit channel indicator and said transmit data channel matching signal and shifts said receive shift register when there is a match between said receive channel indicator and said receive data channel matching signal;
   wherein, at every transmit frame sync signal, said transmit channel indicator is reset and there forward indicates which transmit channel is present at said interface, and wherein at every receive frame sync said receive channel indicator is reset and there forward indicates which receive channel is present at said interface.

6. The TDM arrangement of claim 5, further comprising:
a flag generation circuit coupled to said data pump, said transmit storage register, said framer, said channel counter circuit, and said two stage receive buffering system, said flag generation circuit producing a first flag at said data pump prompting said data pump to write to said transmit storage register upon reception of said transmit frame sync signal, producing a second flag prompting said first receive storage register to latch in data from said receive shift register upon reception of said initial receive channel indicator, producing a third flag at said data pump prompting said data pump to read data from said second receive storage register; and
a processor coupled to said channel selector circuit, said processor controlling the operation of said channel selector circuit.

7. The TDM arrangement of claim 6, wherein said transmit channel indicator is reset to zero upon reception of said transmit frame sync signal and thereafter said transmit channel indicator is incremented by one at a rate corresponding to a transmit channel rate of said TDM arrangement such that said transmit channel indicator indicates the current transmit channel of said TDM arrangement, and wherein said receive channel indicator is reset to zero upon the reception of said receive frame sync signal and thereafter said receive channel indicator is incremented by one at a rate corresponding to a receive channel rate of said TDM arrangement such that said receive channel indicator indicates the current receive channel of said TDM arrangement.

8. A time division multiplexing (TDM) arrangement between a data pump and a TDM bus comprising:
a plurality of shift registers coupled to said TDM bus;
a plurality of storage registers coupled between said data pump and said plurality of shift registers; and
a coordinator coupled to said shift registers, such that said coordinator controls said plurality of shift registers to transfer data from said TDM bus to said storage registers and to transfer data from said storage registers to said TDM bus; wherein said coordinator comprises:
a channel selector for mapping individual channels of said data pump to a transmit time slot and a receive time slot of said TDM bus;
a channel counter for indicating a currently available transmit time slot and a currently available receive time slot on said TDM bus; and
a channel detector having inputs coupled to said channel counter, inputs coupled to said channel selector, and outputs coupled to said plurality of shift registers, said channel detector controlling the flow of data through said shift registers by shifting data onto said TDM bus upon the occurrence of a match between said currently available transmit time slot and said transmit time slot mapped to said individual channels, and latching data in from said TDM bus upon the occurrence of a match between said currently available receive time slot and said receive time slot mapped to said individual channels.

9. A multi-channel time division multiplexing (TDM) arrangement between a multi-channel data pump and a TDM bus comprising:
a first plurality of shift registers having a parallel input, and a serial output coupled to said TDM bus;
a second plurality of shift registers having a parallel output, and a serial input coupled to said TDM bus;
a plurality of single stage storage registers coupled between said multi-channel data pump and said first plurality of shift registers;
a plurality of double stage storage registers coupled between said multi-channel data pump and said second plurality of shift registers;
a transmitting channel counter for indicating which transmit channel is present at said TDM bus;
a receiving channel counter for indicating which receive channel is present at said TDM bus;
an active channel selector for indicating active channels of said multi-channel data pump, relating each of said active channels to a different transmit channel of said TDM bus, and relating each of said active channels to a different receive channel of said TDM bus; and
a channel detector having a first input coupled to said transmitting channel counter, a second input coupled to said receiving channel counter, a third input coupled to said active channel selector, and outputs coupled to said first and second plurality of shift registers, wherein said channel detector directs when an individual shift register of said first and second plurality of shift register should shift data based on a match between said transmitting channel number and said active channel selector, or a match between said receiving channel number and said active channel selector.

10. An integrated circuit for interfacing a multi-channel data pump and a TDM bus comprising:
a first plurality of shift registers having a parallel input, and a serial output coupled to said TDM bus;
a second plurality of shift registers having a parallel output, and a serial input coupled to said TDM bus;
a plurality of single stage storage registers coupled between said multi-channel data pump and said first plurality of shift registers;
a plurality of double stage storage registers coupled between said multi-channel data pump and said second plurality of shift registers;
a transmitting channel counter for indicating which transmit channel is present at said TDM bus;
a receiving channel counter for indicating which receive channel is present at said TDM bus;
an active channel selector for indicating active channels of said multi-channel data pump, relating each of said active channels to a different transmit channel of said TDM bus, and relating each of said active channels to a different receive channel of said TDM bus; and
a channel detector having a first input coupled to said transmitting channel counter, a second input coupled to said receiving channel counter, a third input coupled to said active channel selector, and outputs coupled to said first and second plurality of shift registers, wherein said channel detector directs when an individual shift register of said first and second plurality of shift registers should shift data based on a match between said transmitting channel number and said active channel selector, or a match between said receiving channel number and said active channel selector.

11. A modem box for interfacing a multi-channel data pump and a TDM bus comprising:
a first plurality of shift registers having a parallel input, and a serial output coupled to said TDM bus;
a second plurality of shift registers having a parallel output, and a serial input coupled to said TDM bus;

a plurality of single stage storage registers coupled between said multi-channel data pump and said first plurality of shift registers;

a plurality of double stage storage registers coupled between said multi-channel data pump and said second plurality of shift registers;

a transmitting channel counter for indicating which transmit channel is present at said TDM bus;

a receiving channel counter for indicating which receive channel is present at said TDM bus;

an active channel selector for indicating active channels of said multi-channel data pump, relating each of said active channels to a different transmit channel of said TDM bus, and relating each of said active channels to a different receive channel of said TDM bus; and a channel detector having a first input coupled to said transmitting channel counter, a second input coupled to said receiving channel counter, a third input coupled to said active channel selector, and outputs coupled to said first and second plurality of shift registers, wherein said channel detector directs when an individual shift register of said first and second plurality of shift registers should shift data based on a match between said transmitting channel number and said active channel selector, or a match between said receiving channel number and said active channel selector.

12. A method of interfacing a multiple channel data pump with a TDM bus comprising:

transmitting outgoing data on a channel of said multiple channel data pump;

buffering said outgoing data;

latching said outgoing data into a first shift register after buffering;

selecting a transmit channel on a TDM bus to carry said outgoing data using a channel coordinator; and utilizing said channel coordinator to control shifting of said outgoing data out of said shift register at an appropriate TDM time slot and when said transmit channel on said TDM bus is present.

13. A method of interfacing a multiple channel data pump with a TDM bus comprising:

selecting a receive channel on said TDM bus using a channel coordinator to correspond to a channel of said multiple channel data pump;

utilizing said channel coordinator to control latching of said receive channel of said TDM bus into a shift register at an appropriate TDM time slot and when said receive channel is present;

shifting out said receive channel to a storage register;

buffering said receive channel; and transferring said receive channel after buffering to said channel of said multiple channel data pump.

14. A method of interfacing a multiple channel data pump with a TDM bus comprising:

transmitting outgoing data on a channel of said multiple channel data pump;

buffering said outgoing data;

latching said outgoing data into a first shift register after buffering;

selecting a transmit channel on a TDM bus to carry said outgoing data using a channel coordinator; and utilizing said channel coordinator to control shifting of said outgoing data out of said shift register at an appropriate TDM time slot and when said transmit channel on said TDM bus is present;

selecting a receive channel on said TDM bus using a channel coordinator to correspond to said channel of said multiple channel data pump;

latching said receive channel of said TDM bus into a shift register when said receive channel is present;

shifting out said receive channel to a storage register;

buffering said receive channel; and transferring said receive channel after buffering to said channel of said multiple channel data pump.

15. The method of claim 14, wherein said transmit channel and said receive channel are the same.

16. The method of claim 15, wherein said transmit channel and said receive channel are synchronous to one another.

17. The method of claim 15, wherein said transmit channel and said receive channel are asynchronous to one another.

18. The method of claim 14, wherein said transmit channel and said receive channel are different.

19. The method of claim 18, wherein said transmit channel and said receive channel are synchronous to one another.

20. The method of claim 19, wherein said transmit channel and said receive channel are asynchronous to one another.

21. The method of claim 14, wherein said TDM frame format is selected from a group consisting of T1, E1, 64-Slot, and 128-Slot.

22. A time division multiplexing (TDM) arrangement for interfacing with a TDM bus having a plurality of transmit channels and a plurality of receive channels comprising:

a first data pump for generating a first transmit data signal and receiving a first receive data signal;

a second data pump for generating a second transmit data signal and receiving a second receive data signal;

a first transmit storage register coupled to said first data pump for buffering said first transmit data signal;

a second transmit storage register coupled to said second data pump for buffering said second transmit data signal;

a first transmit shift register coupled between said first transmit storage register and said TDM bus for latching said first transmit data signal from said first transmit storage register and shifting said first transmit data signal onto a first one of said plurality of transmit channels of said TDM bus;

a second transmit shift register coupled between said second transmit storage register and said TDM bus for latching said second transmit data signal from said second transmit storage register and shifting said second transmit data signal onto a second one of said plurality of transmit channels of said TDM bus;

a first receive shift register coupled to said TDM bus for receiving a first one of said plurality of receive channels from said TDM bus;

a second receive shift register coupled to said TDM bus for receiving a second one of said plurality of receive channels from said TDM bus; and a first receive buffer coupled between said first receive shift register and said first data pump for buffering said first one of said plurality of receive channels; and a second receive buffer coupled between said second receive shift register and said second data pump for buffering said second one of said plurality of receive channels;

wherein said first data pump generates said first transmit data signal, said first transmit data signal passes through said first transmit storage register and then through said first transmit shift register onto said TDM bus; and said first receive shift register receives said first one of said plurality of said receive channels as said first receive data signal, said first receive data signal passes through said first receive shift register and then through said first receive buffer to said first data pump; said second data pump generates said second transmit data signal, said second transmit data signal passes through said second transmit storage register and then through said second transmit shift register onto said TDM bus; and said second receive shift register receives said second one of said plurality of said receive channels as said second receive data signal, said second receive data signal passes through said second receive shift register and then through said second receive buffer to said second data pump; and, a channel coordinator coupled to said first transmit shift register and said first receive shift register for controlling said first transmit shift register and said first receive shift register, such that said channel coordinator maps a first one of said plurality of transmit channels to said first transmit data signal and maps a first one of said plurality of receive channels to correspond to said first receive data signal, and said channel coordinator controls said first transmit shift register to shift said first transmit data signal onto said TDM bus when said first one of said plurality of transmit channels is available and controls said first receive shift register to latch a portion of said receive data signal into said first receive shift register when said first one of said plurality of receive channels is available.

23. The TDM arrangement of claim 22, wherein said channel coordinator is further coupled to said second transmit shift register and said second receive shift register for controlling said second transmit shift register and said second receive shift register, such that said channel coordinator maps a second one of said plurality of transmit channels to said second transmit data signal and maps a second one of said plurality of receive channels to said second receive data signal, and said channel coordinator controls said second transmit shift register to shift said second transmit data signal onto said TDM bus when said second one of said plurality of transmit channels is available and controls said second receive shift register to latch a portion of said receive data signal into said second receive shift register when said second one of said plurality of receive channels is available.

* * * * *